United States Patent
Liu et al.

(10) Patent No.: US 10,214,655 B2
(45) Date of Patent: *Feb. 26, 2019

(54) METAL NANOPARTICLE INK DISPERSION

(71) Applicant: XEROX CORPORATION, Norwalk, CT (US)

(72) Inventors: Ping Liu, Mississauga (CA); Michelle Chrétien, Mississauga (CA); Biby Esther Abraham, Mississauga (CA); Cuong Vong, Hamilton (CA); C. Geoffrey Allen, Waterdown (CA); Pedram Salami, Toronto (CA)

(73) Assignee: XEROX CORPORATION, Norwalk, CT (US)

( * ) Notice: Subject to any disclaimer, the term of this patent is extended or adjusted under 35 U.S.C. 154(b) by 263 days.

This patent is subject to a terminal disclaimer.

(21) Appl. No.: 15/098,143

(22) Filed: Apr. 13, 2016

(65) Prior Publication Data

US 2017/0298246 A1    Oct. 19, 2017

(51) Int. Cl.
| | |
|---|---|
| *C09D 11/36* | (2014.01) |
| *C09D 11/033* | (2014.01) |
| *C09D 11/322* | (2014.01) |
| *C09D 11/52* | (2014.01) |
| *B41J 2/01* | (2006.01) |

(52) U.S. Cl.
CPC ............. *C09D 11/36* (2013.01); *B41J 2/01* (2013.01); *C09D 11/033* (2013.01); *C09D 11/322* (2013.01); *C09D 11/52* (2013.01)

(58) Field of Classification Search
CPC ....... C09D 11/52; C09D 11/36; C09D 11/033; C09D 11/322; B41J 2/01
USPC .............................................. 106/31.92, 31.9
See application file for complete search history.

(56) References Cited

U.S. PATENT DOCUMENTS

| | | | |
|---|---|---|---|
| 7,270,694 B2 | 9/2007 | Li et al. | |
| 7,749,300 B2 | 7/2010 | Chretien et al. | |
| 8,324,294 B2 | 12/2012 | Wu et al. | |
| 8,361,350 B2 | 1/2013 | Wu et al. | |
| 8,586,134 B2 * | 11/2013 | Wu | C09D 11/322 427/123 |
| 8,765,025 B2 | 7/2014 | Wu et al. | |

(Continued)

FOREIGN PATENT DOCUMENTS

| | | |
|---|---|---|
| EP | 0 947 532 A1 | 10/1999 |
| EP | 0 947 532 B1 | 1/2006 |

OTHER PUBLICATIONS

European Search Report dated Aug. 21, 2017 for EP application 17164300; 2 pages.*

(Continued)

*Primary Examiner* — Helene Klemanski
(74) *Attorney, Agent, or Firm* — MH2 Technology Law Group LLP

(57) ABSTRACT

A metal nanoparticle ink dispersion is made by mixing ingredients comprising: a first solvent being nonpolar and having a boiling point above 160° C. at 1 atmosphere pressure; a second solvent having a boiling point above 230° C. at 1 atmosphere pressure, the second organic solvent being an aromatic hydrocarbon and having a higher boiling point than the first hydrocarbon solvent; and a plurality of metal nanoparticles. A method of printing the metal nanoparticle ink dispersion is also disclosed.

19 Claims, 1 Drawing Sheet

| >90% Jetting | > 14 Nozzles | |
|---|---|---|
| >60% Jetting | >10 and <14 Nozzles | |
| 0% Jetting | None | |

| Ink sample | 3 min | 5 min | 10 min | 20 min | 30 min | 1 hour | 1.5 hour | 2 hour | 2.5 hour | 3.0 hour |
|---|---|---|---|---|---|---|---|---|---|---|
| Ink of Comparative Example 2B | | | | | | | | | | |
| Ink of Example 2A | | | | | | | | | | |

(56) References Cited

U.S. PATENT DOCUMENTS

| | | | |
|---|---|---|---|
| 8,808,789 B2* | 8/2014 | Liu | H01L 29/458 427/120 |
| 9,174,432 B2 | 11/2015 | Liu et al. | |
| 9,752,040 B2* | 9/2017 | Goredema | C09D 11/52 |
| 2007/0099357 A1 | 5/2007 | Li et al. | |
| 2008/0145560 A1* | 6/2008 | Khaselev | C09D 11/52 106/31.13 |
| 2009/0148600 A1 | 6/2009 | Li et al. | |
| 2009/0181183 A1 | 7/2009 | Li et al. | |
| 2009/0274834 A1 | 11/2009 | Chopra et al. | |
| 2010/0143591 A1 | 6/2010 | Wu et al. | |
| 2012/0043512 A1 | 2/2012 | Liu et al. | |
| 2012/0232206 A1* | 9/2012 | Wu | C09D 11/36 106/31.92 |
| 2012/0279766 A1* | 11/2012 | Wu | C09D 11/322 174/257 |
| 2013/0029034 A1 | 1/2013 | Liu et al. | |
| 2014/0312284 A1 | 10/2014 | Liu et al. | |
| 2014/0377457 A1 | 12/2014 | Liu et al. | |
| 2015/0240100 A1* | 8/2015 | Liu | C09D 11/52 252/514 |
| 2015/0240101 A1 | 8/2015 | Chopra et al. | |
| 2015/0259556 A1 | 9/2015 | Chopra et al. | |
| 2015/0310954 A1* | 10/2015 | Liu | H01B 1/02 428/553 |
| 2016/0177111 A1* | 6/2016 | Goredema | C09D 11/52 427/126.1 |
| 2017/0183536 A1* | 6/2017 | Song | C09D 179/04 |
| 2017/0253757 A1* | 9/2017 | Salami | C09D 11/52 |

OTHER PUBLICATIONS

Dodecyl benzene structure and properties; https://www.chemicalbook.com/ChemicalProductProperty_EN_CB5441237.htm, no date available; 3 pages.*

Song et al, "Interlayer Composition and Devices Made Therefrom," U.S. Appl. No. 15/099,937, filed Apr. 15, 2016.

Song et al., "Interlayer Composition for Electronic Printing," U.S. Appl. No. 14/981,419, filed Dec. 28, 2015.

The DOW Chemical Company, "Product Safety Assessment—DOW Reactive Diluents," Revised May 3, 2012, pp. 1-7.

Goredema et al., "Nanosilver Ink Compositions Comprising Polystyrene Additives," U.S. Appl. No. 14/594,746, filed Jan. 12, 2015.

Goredema et al., "Nanosilver Ink Compositions Comprising Clay Additives," U.S. Appl. No. 14/573,191, filed Dec. 17, 2014.

Salami et al., "Silver Nanoparticle Ink", U.S. Appl. No. 15/061,618, filed Mar. 4, 2016.

* cited by examiner

METAL NANOPARTICLE INK DISPERSION

DETAILED DESCRIPTION

Field of the Disclosure

The present disclosure is directed to a metal nanoparticle ink dispersion.

Background

Solution processable conducting materials that include metal nanoparticles play an important role in the electronic industry. Solution processable metal nanoparticles can be used to fabricate various conducting features in electronic devices, such as electrodes and electrical interconnectors, by low-cost solution deposition and patterning techniques. The metal nanoparticles and other materials used to form the conductive features can be chosen to provide sufficient conductivity to enable proper operations for the electronic devices fabricated.

Metal nanoparticles are known to be dispersed in liquid solution to form inks that can be deposited onto a desired substrate to form conductive metal features. For example, the dispersions can be printed onto the substrate using an inkjet printer and then annealed at low temperatures to form the conductive features.

However, one of the challenges for metal nanoparticle inkjet inks is that the inks exhibit relatively poor in-printhead stability evidenced by short latency times. More specifically, when an inkjet printer, such as a Dimatix printer, is idle over time, such as for several minutes and longer, all or a portion of the nozzles or jets may cease to fire. Some jets or nozzles may be recovered by executing a purge cycle, but this is wasteful and, in the case of precious metal inks, can be costly. Therefore, there is a need to develop silver nanoparticle inks with a more stabilized in-printhead performance that can then be widely used with inkjet technology for electronic device applications.

It would be considered an advancement in the art to develop a novel metal nanoparticle ink dispersion with improved in-printhead stability.

SUMMARY

An embodiment of the present disclosure is directed to a metal nanoparticle ink dispersion. The ink dispersion is made by mixing ingredients comprising: a first solvent being nonpolar and having a boiling point above 160° C. at 1 atmosphere pressure; a second solvent having a boiling point above 230° C. at 1 atmosphere pressure, the second organic solvent being an aromatic hydrocarbon and having a higher boiling point than the first hydrocarbon solvent; and a plurality of metal nanoparticles.

Another embodiment of the present disclosure is directed to a method. The method comprises providing a metal nanoparticle ink dispersion made by mixing ingredients comprising (a) a first organic solvent with a boiling point above 160° C. at 1 atmosphere pressure; (b) a second organic solvent with a boiling point above 230° C. at 1 atmosphere pressure, the second organic solvent having a higher boiling point than the first organic solvent; and (c) a plurality of metal nanoparticles. The ink dispersion is printed onto a substrate.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrates embodiments of the present teachings and together with the description, serve to explain the principles of the present teachings.

DESCRIPTION OF EMBODIMENTS

Metal Nanoparticle Dispersions

Figures 1, 2:
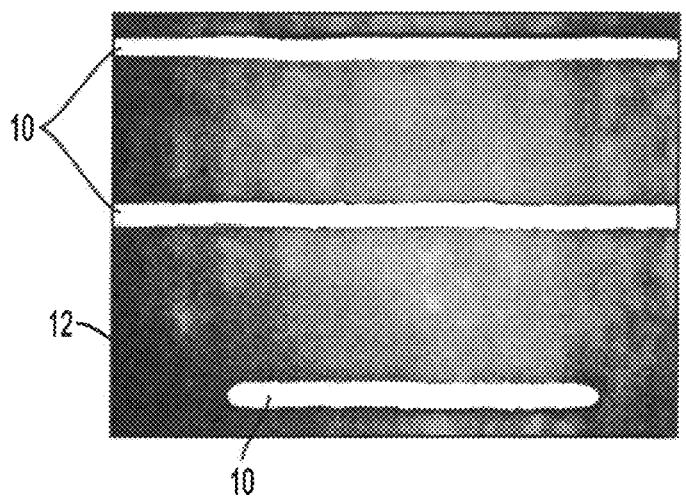
FIG. 1 shows a table with the results of a printing test, according to an example of the present disclosure.
FIG. 2 shows straight lines on a glass substrate, where the lines were printed using metal nanoparticle ink with a Dimatix printer, according to an example of the present disclosure.

An embodiment of the present disclosure is directed to a metal nanoparticle ink dispersion. The ink dispersion is made by mixing ingredients comprising a first solvent, a second solvent and a plurality of metal nanoparticles. The first solvent is nonpolar and has a boiling point above 160° C. at 1 atmosphere pressure. The second solvent is an aromatic hydrocarbon and has a boiling point above 230° C. at 1 atmosphere pressure, which is a higher boiling point than that of the first solvent.

Solvents

The first solvent can be any nonpolar solvent that has a boiling point above 160° C. at 1 atmosphere pressure. The first solvent can provide good dispersion stability for the metal nanoparticles, such as organoamine stabilized silver nanoparticles. In an embodiment, the dipsersability of the first solvent for silver nanoparticles can be better than that of the second solvent. It is noted that the term "solvent" is defined broadly herein to included compounds that act to disperse, rather than dissolve, the solid nanoparticles, although the solvents may optionally provide solubility for one or more other ingredients in the ink dispersion.

In an embodiment, the first solvent is a hydrocarbon. The term "hydrocarbon" for purposes of the present disclosure refers to an organic compound consisting entirely of hydrogen and carbon.

Examples of suitable first solvents include saturated or unsaturated $C_{10}$ to $C_{20}$ hydrocarbons having at least one cyclic group. In an embodiment, the at least one cyclic group can be a saturated or unsaturated 6 carbon group, such as a hexyl group. In an embodiment, the compound includes at least two saturated or unsaturated 6 carbon cyclic groups, which can be linked or fused, where one or both of the cyclic groups are optionally substituted with a linear or branched $C_1$ to $C_8$ hydrocarbyl group, such as methyl, ethyl, propyl or butyl. As an example, the first solvent can be a compound selected from the group consisting of bicyclohexane, decalin, naphthalene and combinations thereof, any of which can be unsubstituted or substituted with a linear or branched $C_1$ to $C_8$ hydrocarbyl group.

The first solvent can have a boiling point that is greater than 160° C. For example, the boiling point can range from about 180° C. to about 240° C., or about 200° C. to about 235° C., or about 220° C. to about 230° C., at 1 atmosphere pressure. The relatively high boiling point of the first solvent may correlate to a relatively low vapor pressure.

The second solvent can be any aromatic hydrocarbon that has a relatively high boiling point above 230° C. at 1 atmosphere pressure while still providing good dispersing characteristics for the metal nanoparticles. In an embodiment, the aromatic hydrocarbon can include a phenyl group substituted with one or more linear, branched or cyclic hydrocarbyl groups of sufficient length so as to provide the desired boiling point. In an embodiment, the second solvent is a $C_{10}$ to $C_{18}$ arylcycloalkane, such as phenylcyclohexane.

The second solvent can have a boiling point that is greater than 230° C. For example, the boiling point can range from about 235° C. to about 300° C., or about 235° C. to about 260° C., or about 235° C. to about 245° C., or about 240° C., at 1 atmosphere pressure. The relatively high boiling point of the second solvent is higher than that of the first solvent and may also correlate to a relatively low vapor pressure that is lower than that of the first solvent.

The combination of both the first solvent and the second solvent facilitates the dispersion of the metal nanoparticles and provides a uniform, stable nanoparticle dispersion. In an embodiment, the dispersion will remain stable for a period of time, such as a day, a week or a month or more, at room temperature. In an embodiment, the dispersion will remain stable for at least six months, such as a year or longer at a temperature of 5° C. Further, the solvent combination may help to reduce or prevent aggregation of the nanoparticles. By incorporating certain amounts of the first and second solvents in the metal nanoparticle inkjet ink formulation, the ink printing properties, such as latency, can be improved.

Any other suitable solvents can optionally be employed in the dispersions of the present disclosure in addition to the first and second solvents. In an embodiment, any optional solvents that are included are non-aqueous, polar or non-polar organic solvents. Examples of optional solvents may include, for example, aromatic hydrocarbons other than the second solvent, such as benzene, toluene, xylene, ethylbenzene, chlorobenzene, dichlorobenzene, trichlorobenzene, nitrobenzene, cyanobenzene and tetralin; an alkane, alkene or an alcohol having from about 10 to about 18 carbon atoms such as, undecane, dodecane, tridecane, tetradecane, hexadecane, hexadecane, 1-undecanol, 2-undecanol, 3-undecanol, 4-undecanol, 5-undecanol, 6-undecanol, 1-dodecanol, 2-dodecanol, 3-dodecanol, 4-dodecanol, 5-dodecanol, 6-dodecanol, 1-tridecanol, 2-tridecanol, 3-tridecanol, 4-tridecanol, 5-tridecanol, 6-tridecanol, 7-tridecanol, 1-tetradecanol, 2-tetradecanol, 3-tetradecanol, 4-tetradecanol, 5-tetradecanol, 6-tetradecanol, 7-tetradecanol, and the like; an alcohol, such as for example, terpineol (α-terpineol), β-terpineol, geraniol, cineol, cedral, linalool, 4-terpineol, lavandulol, citronellol, nerol, methol, borneol, hexanol heptanol, cyclohexanol, 3,7-dimethylocta-2,6-dien-1-ol, 2-(2-propyl)-5-methyl-cyclohexane-1-ol and the like; isoparaffinic hydrocarbons, such as, for example, isodecane, isododecane, and commercially available mixtures of isoparaffins such as ISOPAR® E, ISOPAR G, ISOPAR H, ISOPAR L and ISOPAR M (all the above-mentioned manufactured by Exxon Chemical Company), SHELLSOL® (made by Shell Chemical Company), SOLTROL® (made by Philips Oil Co., Ltd.), BEGASOL® (made by Mobil Petroleum Co., Inc.) and IP Solvent 2835 (made by Idemitsu Petrochemical Co., Ltd.); naphthenic oils; ethers, such as tetrahydrofuran; nitriles, such as acetonitrile; halogenated solvents, such as dichloromethane; amides such as N,N-dimethylformamide (DMF); and mixtures of any of the above solvents. One, two, three or more of the optional solvents may be used in addition to the first and second solvents.

The first and second solvents may be present at any suitable ratio. For example, a ratio by weight of the first solvent to the second solvent can range from about 99:1 to about 1:99, or from about 80:20 to about 20:80, or from about 70:30 to about 30:70. In an embodiment, more of the first solvent is employed than the second solvent.

In an embodiment where an optional polar solvent is employed, it may be used in relatively small amounts compared to the nonpolar solvents in the mixture. For example, the weight ratio of polar to nonpolar solvents can be less that 2:3, such as 1:2, 1:3, 1:4, 1:5 or 1:10 or less. In an embodiment, no optional solvents are added, so that substantially only the first and second solvents are included except minor amounts that may be added with the other ingredients (e.g., less than 10% by weight, such as 5% or 2% or 1% by weight or less, based on the total weight of the dispersion).

The total amount of the first and second solvents may be present in the metal nanoparticle dispersion in an amount of at least 10 wt. %, based on the wt. % of the entire dispersion, such as, for example from about 10 wt. % to about 90 wt. %, from about 20 wt. % to about 80 wt. %, from about 30 wt. % to about 70 wt. % and from about 40 wt. % to about 60 wt. % of the dispersion. In an embodiment, the total amount of the first and second solvents is included in the dispersion in an amount that is at least 50 wt. %, based on the wt. % of the entire dispersion.

Metal Nanoparticles

The term "nano" as used in "metal nanoparticles" refers to, for example, a particle size of 100 nm or less, such as, for example, from about 0.5 nm to about 100 nm, for example, from about 1 nm to about 50 nm, from about 1 nm to about 25 nm, or from about 1 nm to about 10 nm. The particle size refers to the average diameter of the metal particles, as determined by TEM (transmission electron microscopy). Generally, a plurality of particle sizes may exist in the metal nanoparticles obtained from the process described herein. In embodiments, the existence of different sized metal-containing nanoparticles is acceptable.

In embodiments, the metal nanoparticles are composed of (i) one or more metals or (ii) one or more metal composites. Any suitable metals can be employed. Examples of metals include Al, Ag, Au, Pt, Pd, Cu, Co, Cr, In, and Ni, particularly the transition metals, such as, Ag, Au, Pt, Pd, Cu, Cr, Ni, and mixtures thereof. Suitable metal composites may include Au—Ag, Ag—Cu, Ag—Ni, Au—Cu, Au—Ni, Au—Ag—Cu, and Au—Ag—Pd. The metal composites may also include non-metals, such as, for example, Si, C, and Ge. The various components of the metal composite may each be present in the composite in any amount, such as amounts ranging for example from about 0.01% to about 99.9% by weight, particularly from about 10% to about 90% by weight, with the amounts being adjusted to provide desired characteristics, such as to provide the desired conductivities for the resulting printed features.

In an embodiment, the metal nanoparticles comprise silver. For example, the metal of the nanoparticles can be a metal alloy composed of silver and one, two or more other metals, with silver comprising, for example, at least about 20% of the nanoparticles by weight, particularly greater than about 50% of the nanoparticles by weight. Unless otherwise noted, the weight percentages recited herein for the components of the metal nanoparticles do not include the weight of any stabilizer or oxide formation that may be part of the nanoparticle.

The metal nanoparticles may be a mixture of two or more bimetallic metal nanoparticle species, such as those described in commonly assigned U.S. patent application Ser. No. 12/113,628 to Naveen Chopra et al., filed May 1, 2008, which is incorporated herein by reference in its entirety, or a bimodal metal nanoparticle, such as those described in U.S. patent application Ser. No. 12/133,548 to Michelle N. Chretien filed Jun. 5, 2008 now U.S. Pat. No. 7,749,300, which is also incorporated herein by reference in its entirety.

The dispersions of the present disclosure can include any suitable amount of metal nanoparticles. In an embodiment, the metal nanoparticles are in a concentration ranging from about 10 wt. % to about 90 wt. %, such as about 30 wt. % to about 70 wt. %, such as about 40 wt. % to about 60 wt. %, based on the total weight of the dispersion.

The metal nanoparticles can optionally include one or more organic stabilizing groups attached thereto to form a stabilized nanoparticle complex. Stabilizing groups (which may be referred to herein as stabilizers, stabilizer groups or ligands) are generally well known in the art for enhancing or maintaining the dispersability of nanoparticles and/or to reduce aggregation of the nanoparticles in a dispersion. The term "attached" in the context of the stabilizing groups being attached to the nanoparticles means that the stabilizer is generally physically or chemically associated with the surface of the nanoparticles. In this way, the nanoparticles (e.g., silver nanoparticles or other metal nanoparticles described herein) have the stabilizer thereon outside of a liquid solution. That is, the nanoparticles with the stabilizer thereon may be isolated and recovered from a reaction mixture solution used in forming the nanoparticle and stabilizer complex. The stabilized nanoparticles may thus be subsequently readily and homogeneously dispersed in a solvent for forming a printable liquid.

As used herein, the phrase "physically or chemically associated" used to describe the attachment between the nanoparticles and the stabilizer may be a chemical bond and/or other physical attachment. The chemical bond may take the form of, for example, covalent bonding, hydrogen bonding, coordination complex bonding, or ionic bonding, or a mixture of different chemical bonds. The physical attachment may take the form of, for example, van der Waals' forces or dipole-dipole interaction, or a mixture of different physical attachments. The stabilizer can be attached to the nanoparticle via a linking group or directly to the nanoparticle itself.

The term "organic" in "organic stabilizing group" or "organic stabilizer" refers to, for example, the presence of carbon atom(s), but the organic stabilizer may include one or more non-metal heteroatoms such as nitrogen, oxygen, sulfur, silicon, halogen, and the like. The organic stabilizer may be an organoamine stabilizer such as those described in U.S. Pat. No. 7,270,694, which is incorporated by reference herein in its entirety. Examples of the organoamine are an alkylamine, such as for example butylamine, pentylamine, hexylamine, heptylamine, octylamine, nonylamine, decylamine, hexadecylamine, undecylamine, dodecylamine, tridecylamine, tetradecylamine, diaminopentane, diaminohexane, diaminoheptane, diaminooctane, diaminononane, diaminodecane, diaminooctane, dipropylamine, dibutylamine, dipentylamine, dihexylamine, diheptylamine, dioctylamine, dinonylamine, didecylamine, methylpropylamine, ethylpropylamine, propylbutylamine, ethylbutylamine, ethylpentylamine, propylpentylamine, butylpentylamine, tributylamine, trihexylamine, and the like, or mixtures thereof. These organoamines can be attached to the nanoparticle in any desired manner, such as via a carboxylate linking group or other carboxylic acid derived linking group, as in the carboxylic acid-organoamine complex stabilized silver nanoparticles mentioned herein.

Examples of other organic stabilizers include thiol and its derivatives, —OC(—S)SH (xanthic acid), polyethylene glycols, polyvinylpyridine, polyvinylpyrolidone, and other organic surfactants. The organic stabilizer may be selected from the group consisting of a thiol such as, for example, butanethiol, pentanethiol, hexanethiol, heptanethiol, octanethiol, decanethiol, and dodecanethiol; a dithiol such as, for example, 1,2-ethanedithiol, 1,3-propanedithiol, and 1,4-butanedithiol; or a mixture of a thiol and a dithiol. The organic stabilizer may be selected from the group consisting of a xanthic acid such as, for example, O-methylxanthate, O-ethylxanthate, O-propylxanthic acid, O-butylxanthic acid, O-pentylxanthic acid, O-hexylxanthic acid, O-heptylxanthic acid, O-octylxanthic acid, O-nonylxanthic acid, O-decylxanthic acid, O-undecylxanthic acid, O-dodecylxanthic acid. Organic stabilizers containing a pyridine derivative (for example, dodecyl pyridine) and/or organophosphine that can stabilize metal nanoparticles may also be used as a potential stabilizer.

Examples of stabilized metal nanoparticles include: the carboxylic acid-organoamine complex stabilized silver nanoparticles, described in U.S. Patent Application Pub. No. 2009/0148600; the carboxylic acid stabilizer silver nanoparticles described in U.S. Patent App. Pub. No. 2007/0099357 A1, and the thermally removable stabilizer and the UV decomposable stabilizers described in U.S. Patent Application Pub. No. 2009/0181183, each of which is incorporated by reference herein in its entirety.

Additional Optional Ingredients

The compositions of the present disclosure can include one or more additional optional ingredients suitable for use in metal nanoparticle dispersions. An example of one such optional ingredient is a polymeric adhesion promoter. Polymeric adhesion promoters can function to increase the adhesion of the metal nanoparticles upon deposition to a substrate and/or allow for a conductive film with an increased thickness, such as, for example, up to about 15 micrometers to be deposited on a substrate. The inclusion of a polymeric binder in the composition may also potentially improve the mechanical properties for the deposited conductive feature, such as resistance to scratching, increased flexibility and resistance to cracking. Any polymeric adhesion promoter may be included in the composition, such that a glass transition temperature of the polymeric adhesion promoter is lower than the heating temperature for the deposited composition, assuming the polymeric adhesion promoter is compatible with jettability and stability requirements for the ink formation.

Examples of polymeric adhesion promoters include organic polymeric film forming binders such as thermoplastic and thermosetting resins such as polycarbonates, polyesters, polyam ides, polyurethanes, polystyrenes, polyarylethers, polyarylsulfones, polybutadienes, polysulfones, polyethersulfones, polyethylenes, polypropylenes, polyimides, polymethylpentenes, polyphenylene sulfides, polyvinyl acetate, polysiloxanes, polyacrylates, polyvinyl acetals, polyamides, amino resins, phenylene oxide resins, terephthalic acid resins, phenoxy resins, epoxy resins, phenolic resins, polystyrene and acrylonitrile copolymers, polyvinylchloride, vinylchloride and vinyl acetate copolymers, acrylate copolymers, alkyd resins, cellulosic film formers, poly(amideimide), styrenebutadiene copolymers, vinylidenechloride-vinylchloride copolymers, vinylacetate-vinylidenechloride copolymers, styrene-alkyd resins, polyvinylcarbazole, polyvinyl butyral resins and the like. These polymers may be, for example, block, random or alternating copolymers.

Examples of polyvinyl butyral resins (PVB) resins are disclosed in U.S. 2012/0043512, the disclosure of which is hereby incorporated by reference in its entirety. Commercial examples of PVB resins are manufactured under the trade name MOWITAL (Kuraray America), S-LEC (Sekisui Chemical Company), BUTVAR (Solutia, Inc.), and PIOLO-FORM (Wacker Chemical Company).

Any suitable techniques can be employed for making the nanoparticle dispersions of the present disclosure. For example, the method can comprise providing a metal nanoparticle dispersion made by mixing ingredients comprising the first solvent, second solvent and plurality of metal nanoparticles, wherein the first solvent, the second solvent and the nanoparticles are as described above. Any of the optional additional ingredients discussed herein can also be included in the mixture.

The metal nanoparticles can be stabilized as described above. Methods for making stabilized nanoparticles are well known in the art. Any suitable technique can be employed for stabilizing the metal nanoparticles used in the dispersions of the present disclosure.

Printing Process

An embodiment is also directed to a method of printing using any of the inks of the present disclosure. The method comprises providing a metal nanoparticle ink dispersion and printing the ink dispersion onto a substrate. As described herein, the ink dispersion is made by mixing ingredients comprising a first solvent, a second solvent and a plurality of metal nanoparticles. The first solvent is nonpolar and has a boiling point above 160° C. at 1 atmosphere pressure. The second solvent is an aromatic hydrocarbon and has a boiling point above 230° C. at 1 atmosphere pressure, which is a higher boiling point than that of the first hydrocarbon solvent.

The ink dispersion can be provided in any manner suitable for inkjet printing. The ink dispersion can be printed on the substrate to form a nanoparticle ink pattern using any suitable inkjet printing technique. Examples of suitable inkjet printing techniques are well known in the art.

The substrate upon which the metal nanoparticle dispersion is printed may be any suitable substrate, including, for example, silicon, glass, plastic, fabric, or paper. For structurally flexible devices, plastic substrates, such as for example, polyester, polycarbonate, polyimide sheets and the like may be used. The substrate may have any desired thickness, such as, for example, from about 10 micrometers to over 10 millimeters, such as from about 50 micrometers to about 2 millimeters, or from about 0.4 millimeters to about 10 millimeters.

After selectively depositing the metal nanoparticle dispersion to form a nanoparticle ink pattern on the substrate during printing, the ink can be heated to form a desired conductive metal pattern on the substrate. Any suitable heating temperatures can be employed. The temperatures used can depend on a variety of factors, such as the particular metal nanoparticle dispersion being used, the ability of the substrate to withstand high temperatures, the desired properties of the resulting film, and so forth. Examples include temperatures ranging from about 80° C. to about 200 or 250° C. For example, the deposited composition can be heated to a temperature at or below 160° C., such as, for example, from about 80° C. to about 140° C., or from about 80° C. to about 130° C., to induce or "anneal" the metal nanoparticles to form conductive features which are suitable for use as an electrically conductive element.

The heating can be performed for any suitable time ranging from, for example, 1 minute to about 10 hours, from about 5 minutes to about 5 hours and from about 10 minutes to about 3 hours. The heating can be performed in air, in an inert atmosphere, for example, under nitrogen or argon, or in a reducing atmosphere, for example, under nitrogen containing from 1 to about 20 percent by volume hydrogen. The heating can also be performed under normal atmospheric pressure or at a reduced pressure of, for example, from about 1000 mbars to about 0.01 mbars.

As used herein, the term "heating" encompasses any technique(s) that can impart sufficient energy to the heated material or substrate to (1) anneal the metal nanoparticles and/or (2) remove the optional stabilizer from the metal nanoparticles. Examples of heating techniques may include thermal heating (for example, a hot plate, an oven, and a burner), infra-red ("IR") radiation, a laser beam, microwave radiation, or UV radiation, or a combination thereof.

Heating produces an electrically conductive pattern from the deposited metal nanoparticle dispersion. In embodiments, after heating, the resulting electrically conductive pattern has a thickness ranging, for example, from about 5 nanometers to about 500 micrometers, such as from about 10 nanometers to about 200 micrometers, or from about 100 nanometers to about 100 micrometers, from about 1 micrometers to about 25 micrometers, or from about 10 micrometers to about 20 micrometers.

The metal patterns formed by the methods of the present disclosure can be electrically conductive. The conductivity can vary depending on a number of factors, including the type of metal being deposited and the deposition and annealing process employed. Examples include conductivities greater than $1.0 \times 10^4$ Siemens/centimeter ("S/cm"), such as about 500,000 S/cm, or about 100,000 S/cm to about 50,000 S/cm.

EXAMPLES

Example 1: Preparation of Dodecylamine-Stabilized Silver Nanoparticles

To a 3-neck round-bottom reaction flask, dodecylamine (444.55 g), decalin (150 mL), and methanol (30 mL) were added and the mixture was heated with good stirring up to ~37° C. until dodecylamine was dissolved. Then, a reducing agent phenylhydrazine (32.70 g) was added to the solution with good stirring for ~5 minutes. Silver acetate (100 g) was added gradually in duration of ~1.5 to 2.0 hours at a temperature range of 35 to 38° C. The color of the reaction mixture was changed from clear to dark brownish during the addition, indicating the formation of silver nanoparticles. After the addition, the reaction mixture was heated to 40° C. and was stirred at this temperature for one hour.

The crude product was precipitated by adding 750 mL of MeOH with good stirring for 10 minutes and then collected by filtration. The collected wet cake was transferred to a glass beaker and stirred in 250 mL of methanol for 30 minutes twice. The final product was collected by filtration and dried at a vacuum oven at room temperature for 24 hours, yielding 68.3 g of stabilized silver nanoparticles with dark color.

Example 2A: Preparation of New Silver Nanoparticle Ink

A new silver nanoparticle ink sample was prepared from the silver nanoparticles of Example 1. The ink contained approximately 50 wt % silver nanoparticles in bicyclohexane (BCH):phenylcyclohexane (3:2 by weight). The following procedure was used to make the ink. To 50 grams of silver nanoparticle powder in a brown glass container (120 mL), both bicyclohexane (30 g) and phenylcyclohexane (20 g) were added. The resulting mixture was mixed by gently shaking the sample using an orbital mixer for about 2 hours and then placed on a roll mill at low speed for 22 hours. After this period of mixing, the resulting mixture was filtered with a 1 um glass fiber syringe filter, yielding ~98 g of the conducting silver nanoparticle ink.

Comparative Example 2B: Silver Nanoparticle Ink

A second silver nanoparticle ink sample was made that was similar to that of Example 2A, except that the approximately 50 wt % silver nanoparticles were dispersed in decalin:bicyclohexane (BCH) (3:2 by weight) instead of BCH and phenylcyclohexane.

Example 3: Printing Test

A printing test of this conductive ink was carried out by inkjet with a Dimatix printer. The printing stability or latency time was evaluated according to the following experiment conditions: The print head was kept on the drop watcher without purging while testing was performed at various time intervals to examine how many nozzles still jetted. The total Dimatix print head nozzles were 16. The results were tabulated in the table shown in FIG. 1, where the degree of shading shows the number of nozzles working.

The data indicated excellent printing stability of the ink of Example 2A, as well as the continued formation of stable droplets. More specifically, the printing nozzles of a printer cartridge containing the silver nanoparticle ink of Example 2A could continue to print after the printer was idled for over 2 hours (with no purging required). The printing latency time was dramatically improved compared with the comparative inkjet ink formulation of Example 2B. For example, the printing nozzles of a printer cartridge containing the inkjet silver nanoparticle ink of Example 2B required purging after the printer was idled only for a very short period of time (~3 minutes). This dramatic improvement in printing stability was achieved due to the optimal ink composition with optimally ranged ink properties including viscosity, surface tension, and where the inks' carrier solvents are high boiling point to prevent ink wicking out, evaporating, etc. from printing cartridge nozzles and then drying to block the nozzles during the printing, especially when the printer was set in "idle mode". Solvents with good dispersion stability for silver nanoparticles, sufficiently high boiling point and sufficiently low vapor pressure resulted in the improved printing stability.

In addition to good printing stability, printed features made with the ink of Example 2A, such as printed lines on glass, PET and PEN substrates were highly conductive (~1.0×10$^5$ S/cm) after they were annealed at 120° C. for ~10 min. Examples of printed features 10 printed on a glass substrate 12 using the ink of Example 2 and a Dimatix printer are shown in the Figure.

Thus, using inks of the present disclosure the printing latency time increased from about 3 to about 5 min (previous ink formulation) to about 2 hours to about 2.5 hours in a Dimatix printhead. The printing latency time may depend on the type of printer employed, and latency times of >24 hours may be possible in other, more industrially relevant, printheads. Thus, the conductive inks of the present disclosure have a high potential to be used in manufacturing production for a wide range of electronic device applications and inkjet printing technologies.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. A metal nanoparticle inkjet ink dispersion made by mixing ingredients comprising:
   a first solvent being nonpolar and having a boiling point above 160° C. at 1 atmosphere pressure;
   a second solvent having a boiling point above 230° C. at 1 atmosphere pressure, the second solvent being a $C_{10}$ to $C_{18}$ arylcycloalkane and having a higher boiling point than the first solvent; and
   a plurality of metal nanoparticles,
   wherein a weight percent of the first solvent is greater than the weight percent of the second solvent in the inkjet ink dispersion.

2. The dispersion of claim 1, wherein the first solvent is a saturated or unsaturated $C_{10}$ to $C_{20}$ hydrocarbon having at least one cyclic group.

3. The dispersion of claim 1, wherein the first solvent is a compound selected from the group consisting of bicyclohexane, decalin, naphthalene and combinations thereof.

4. The dispersion of claim 1, wherein the second solvent is phenylcyclohexane.

5. The dispersion of claim 1, wherein a total amount of the first solvent and second solvent is at least 10 wt. %, based on the total weight of the composition.

6. The dispersion of claim 1, wherein the metal nanoparticles comprise at least one metal selected from the group consisting of Al, Ag, Au, Pt, Pd, Cu, Co, Cr, In and Ni.

7. The dispersion of claim 1, wherein the metal nanoparticles comprise Ag.

8. The dispersion of claim 1, wherein the metal nanoparticles are in a concentration ranging from about 10 wt. % to about 90 wt. %.

9. The dispersion of claim 1, wherein the metal nanoparticles include an organic stabilizing group attached thereto.

10. The dispersion of claim 1, further comprising a polymeric adhesion promoter.

11. A method comprising:
providing a metal nanoparticle ink dispersion made by mixing ingredients comprising (a) a first organic solvent with a boiling point above 160° C. at 1 atmosphere pressure; (b) a second organic solvent with a boiling point above 230° C. at 1 atmosphere pressure, the second organic solvent having a higher boiling point than the first organic solvent, the second organic solvent being a $C_{10}$ to $C_{18}$ arylcycloalkane; and (c) a plurality of metal nanoparticles; and
inkjet printing the ink dispersion onto a substrate.

12. The method of claim 11, wherein the printing comprises:
selectively depositing the metal nanoparticle dispersion to form a nanoparticle ink pattern on the substrate; and
heating the deposited nanoparticle ink pattern to form a conductive metal pattern.

13. The method of claim 12, wherein the metal pattern has a conductivity that is greater than $1.0 \times 10^4$ S/cm.

14. The method of claim 12, wherein the heating is performed at a temperature ranging from about 80° C. to about 250° C.

15. The method of claim 11, wherein the metal nanoparticles comprise at least one metal selected from the group consisting of Al, Ag, Au, Pt, Pd, Cu, Co, Cr, In and Ni.

16. The method of claim 11, wherein the metal nanoparticles comprise Ag.

17. The method of claim 11, wherein the first solvent is a saturated or unsaturated $C_{10}$ to $C_{20}$ hydrocarbon having at least one cyclic group.

18. The method of claim 11, wherein the first solvent is a compound selected from the group consisting of bicyclohexane, decalin and combinations thereof.

19. The method of claim 11, wherein the second solvent is phenylcyclohexane.

* * * * *